(12) United States Patent
Desai et al.

(10) Patent No.: US 11,609,898 B2
(45) Date of Patent: Mar. 21, 2023

(54) ENSURING CONSISTENT METADATA ACROSS COMPUTING DEVICES

(71) Applicant: Apple Inc., Cupertino, CA (US)

(72) Inventors: Meha N. Desai, Palo Alto, CA (US); Eric B. Tamura, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 17/031,259

(22) Filed: Sep. 24, 2020

(65) Prior Publication Data
US 2021/0397600 A1 Dec. 23, 2021

Related U.S. Application Data

(60) Provisional application No. 63/040,940, filed on Jun. 18, 2020.

(51) Int. Cl.
| | |
|---|---|
| *G06F 16/23* | (2019.01) |
| *G06F 16/22* | (2019.01) |
| *G06F 16/2457* | (2019.01) |
| *G06F 16/16* | (2019.01) |
| *H04L 9/08* | (2006.01) |
| *H04L 9/06* | (2006.01) |

(52) U.S. Cl.
CPC ...... *G06F 16/2365* (2019.01); *G06F 16/2246* (2019.01); *G06F 16/24573* (2019.01); *H04L 9/0643* (2013.01); *H04L 9/0825* (2013.01)

(58) Field of Classification Search
CPC ............. G06F 16/2365; G06F 16/2246; G06F 16/24573; G06F 16/164; G06F 16/9027; G06F 16/152; H04L 9/0643; H04L 9/0825
See application file for complete search history.

(56) References Cited

U.S. PATENT DOCUMENTS

| | | | | |
|---|---|---|---|---|
| 2007/0260674 A1* | 11/2007 | Shenfield | ............... | H04L 67/28 707/E17.108 |
| 2009/0030952 A1* | 1/2009 | Donahue | ............... | G06F 16/256 707/999.203 |
| 2009/0037488 A1* | 2/2009 | Abrams | ............... | G06F 16/258 |
| 2010/0212017 A1* | 8/2010 | Li | ............... | H04L 9/3236 726/26 |
| 2013/0138615 A1* | 5/2013 | Gupta | ............... | G06F 11/1471 707/E17.007 |
| 2014/0053145 A1* | 2/2014 | Steigleder | ............... | G06F 8/65 717/169 |

(Continued)

*Primary Examiner* — Dennis Truong
(74) *Attorney, Agent, or Firm* — Kilpatrick, Townsend & Stockton

(57) ABSTRACT

Techniques are disclosed for ensuring consistent metadata across computing devices. In one example, a user device of a plurality of user devices receives a manifest that includes first metadata associated with a file system update of a file system of the user device. The user device generates second metadata of the file system based on performing the file system update. The user device then generates a dictionary based on comparing metadata records of the first metadata with metadata records of the second metadata. The dictionary may indicate a difference between at least one metadata record of the first metadata and at least one metadata record of the second metadata. The user device then updates the second metadata of the file system to match the first metadata based at least in part on the difference indicated by the dictionary.

18 Claims, 6 Drawing Sheets

(56) References Cited

U.S. PATENT DOCUMENTS

| | | | | |
|---|---|---|---|---|
| 2015/0169668 A1* | 6/2015 | Preslan | ............... | G06F 16/11 |
| | | | | 707/691 |
| 2017/0364274 A1* | 12/2017 | Hammons | ........... | G06F 11/1446 |
| 2019/0392051 A1* | 12/2019 | Damyanov | ........... | G06F 16/278 |

* cited by examiner

```
┌─────────────────────────────────────────────────────────────┐
│ GENERATE, BY A SERVER DEVICE, A MANIFEST THAT INCLUDES FIRST│
│ METADATA ASSOCIATED WITH A FILE SYSTEM UPDATE, THE FILE     │
│ SYSTEM UPDATE BEING APPLICABLE TO A PLURALITY OF USER       │
│ DEVICES 602                                                 │
└─────────────────────────────────────────────────────────────┘
                              │
                              ▼
┌─────────────────────────────────────────────────────────────┐
│ TRANSMIT, BY THE SERVER DEVICE, THE MANIFEST TO AT LEAST    │
│ ONE USER DEVICE OF THE PLURALITY OF USER DEVICES, THE       │
│ MANIFEST BEING UTILIZABLE FOR UPDATING METADATA OF A FILE   │
│ SYSTEM OF THE AT LEAST ONE USER DEVICE 604                  │
└─────────────────────────────────────────────────────────────┘
                              │
                              ▼
┌─────────────────────────────────────────────────────────────┐
│ GENERATE, BY THE SERVER DEVICE, A FIRST HASH ASSOCIATED     │
│ WITH THE FIRST METADATA ASSOCIATED WITH THE FILE SYSTEM     │
│ UPDATE 606                                                  │
└─────────────────────────────────────────────────────────────┘
                              │
                              ▼
┌─────────────────────────────────────────────────────────────┐
│ TRANSMIT, BY THE SERVER DEVICE, THE FIRST HASH TO THE AT    │
│ LEAST ONE USER DEVICE, THE FIRST HASH BEING UTILIZABLE FOR  │
│ VERIFYING THE UPDATED METADATA OF THE FILE SYSTEM OF THE    │
│ AT LEAST ONE USER DEVICE 608                                │
└─────────────────────────────────────────────────────────────┘
```

FIG. 6

ENSURING CONSISTENT METADATA ACROSS COMPUTING DEVICES

CROSS-REFERENCES TO RELATED APPLICATIONS

This application claims priority to U.S. Provisional Application Ser. No. 63/040,940, filed Jun. 18, 2020, which is hereby incorporated by reference in its entirety for all purposes.

BACKGROUND

Techniques exist for updating files of a file system on a computing device. For example, a server device may generate an update package that includes one or more update files. The server device may transmit the update package to the computing device, whereby the computing device then installs the update package. During the installation, one or more files may be added, removed, and/or replaced on the computing device. Also, during the installation, metadata that is associated with the one or more update files may be generated and stored on the device. When a particular update is pushed to multiple computing devices for installation on each device, each computing device may generate (and/or store) different metadata during the installation of the particular update, for example, based on a non-deterministic ordering in which files are installed on each device. With each computing device potentially storing different metadata associated with a particular update, it can be difficult for a particular computing device to verify the integrity of the metadata generated by the particular computing device.

BRIEF DESCRIPTION OF THE DRAWINGS

FIG. 6 is another simplified flow diagram illustrating an example process for ensuring consistent metadata across computing devices, according to some embodiments.

DETAILED DESCRIPTION OF THE DISCLOSURE

Figure 1:
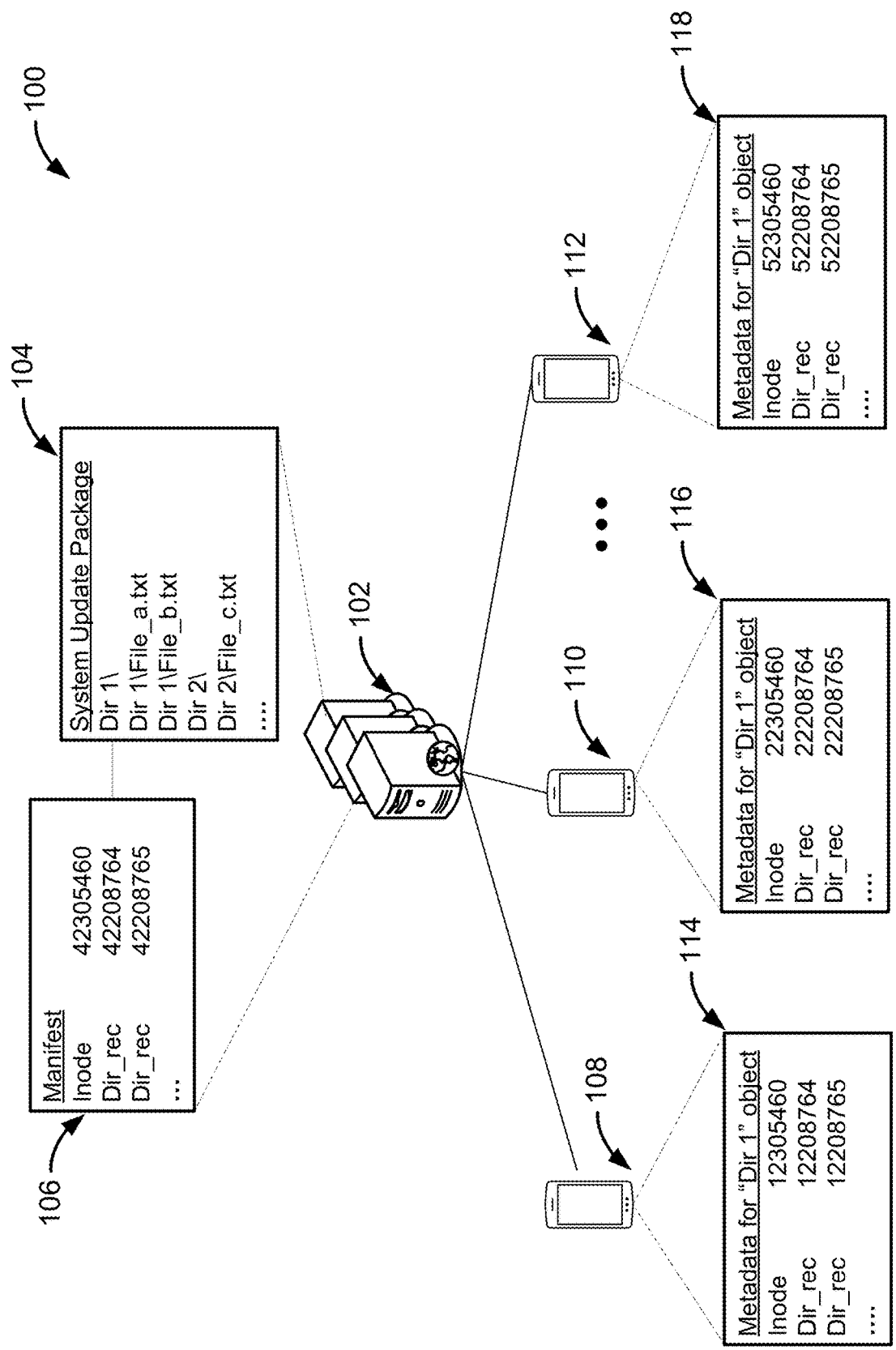
FIG. 1 is a simplified block diagram of an example environment, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure can provide techniques for achieving consistent (e.g., identical or substantially identical) file system metadata across a plurality of computing devices. In an illustrative example, consider a scenario in which a service provider periodically provides updates applicable to a particular operating system (OS) that executes a particular file system type. A server device of the service provider may, in addition to generating the update, also generate a signed reference manifest that includes metadata associated with the update. For example, the metadata may include metadata records for different files included in the update. The server device may transmit the update and the associated manifest (e.g., in an OS bundle and/or image) to one or more computing devices (e.g., user devices such as mobile phones). The one or more user devices (e.g., each executing the particular OS with the particular file system type) may receive the update from the server device and then install the update.

During installation of the update by each of the user devices, a representative user device may generate metadata, for example, associated with files installed and/or updated by the update. After the installation completes, the user device may execute a process that compares the metadata generated during the update installation with the metadata within the reference manifest received from the server device. The process may output a dictionary, whereby the dictionary captures the differences between the on-disk file system metadata (following the update) and the reference manifest. Then, the user device may further execute a process that iterates through metadata of the stored on-disk file system (e.g., in a tree data structure) and updates the metadata to conform to the specification provided in the reference manifest. Accordingly, although each user device may respectively initially generate different metadata from the other user devices during installation of the update (e.g., in a non-deterministic installation process), each user device may perform these techniques to conform the respective on-disk file system metadata to the same reference manifest provided by the server device, thus ensuring consistent metadata across the different user devices. In some examples, ensuring consistent metadata includes ensuring identical metadata.

In an illustrative example that corresponds to the example above, consider a scenario in which a service provider may implement and/or maintain one or more operating systems. Each OS may utilize a particular file system type (of a plurality of possible file system types). In some cases, multiple operating systems (e.g., for different types of user devices) may utilize the same file system type. For example, a same (or different) file system may be used by a mobile device OS, a personal computer (PC) OS, etc. A disk volume of a user device may contain a particular file system, whereby the particular file system may maintain one or more file system objects. A file system object may store information about a part of the file system, for example, such as a directory or a file on disk. The file system object may be stored as one or more records (or "metadata records"). In one example, a file system object for a directory that contains two files may be stored as three metadata records: an inode record, and two directory records for each of the directory entries. Each metadata record may include one or more fields, and each field may be associated with a particular assigned value (e.g., a unique numeric identifier). It should be understood that the number and/or types of metadata records, and/or the associated fields for each metadata record may depend in part on the particular type of file system being employed by the particular OS of a computing device. In some embodiments, as described further herein, the metadata records are stored as key/value pairs in a tree data structure (e.g., a B-tree). The key may contain information that is used to look up a record (e.g., an object identifier, a record type). The value may correspond to any suitable value (e.g., a value of a particular field of the record), depending on the type of record.

In some embodiments, a server device of the service provider may generate a file system update for a disk volume that contains a particular file system (e.g., for a particular OS). For example, the server device may determine to generate a file system update for all user devices (e.g., mobile phones) executing a mobile phone OS that utilizes the particular file system. In this example, the update may impact a system volume, containing, among other objects, system files and system directories. Accordingly, because the update impacts the system volume, whereby a user may be prevented from removing files), the number of objects (e.g., the number of the set of files) of the volume and a name of each file of the set of files may be common to each user device that has the same system volume (e.g., the same OS with the particular file system). In some embodiments, the file system update may also impact non-system files that are configured to allow user edits to the data contents of a file, but not to allow the user to remove and/or rename the file. For example, a system administrator may lock down certain files (e.g., and/or regions of the disk volume) to allow a user to make edits to the data contents of a particular file, but not to rename or remove the particular file. In this way, whether the file system update impacts system files and/or non-system files, the number of files and the name of the files are common to each user device being updated. Any suitable number of objects of a volume may be updated (e.g., added, removed, changed) within the file system update.

Upon generating the file system update, the server device may also generate a manifest (a "reference manifest") that includes metadata ("first metadata") associated with the file system update. For example, the manifest may contain substantially all (or any suitable number) of the metadata records associated with the disk volume that is being updated. In some embodiments, the file system update and the manifest may be bundled together, and then transmitted by the server device to a plurality of user devices.

In some embodiments, the server device may also generate a hash (a "first hash") associated with the first metadata associated with the file system update. For example, for server device may first generate respective hashes (e.g., hash values) for individual metadata records (e.g., leaf nodes) that are stored within a tree data structure (e.g., a B-tree). As described above, in some embodiments, the tree data structure may represent metadata associated with the disk volume being updated (e.g., the metadata records associated with the file system update). In some embodiments, a hash may be stored as part of a particular leaf node of the tree data structure. In some embodiments, the hash may be generated using any suitable hash function. A parent node of one or more leaf nodes may also store a hash of the hashes of the child nodes, and so forth. Accordingly, server device may finally generate the first hash (i.e., a hash value) for the root node of the tree data structure, whereby the first hash represents (e.g., encompasses) a hash of the all the children nodes of the tree data structure. In this way, the first hash (e.g., a numeric value) may represent the first metadata included within the reference manifest and associated with the file system update. In some embodiments, the server device may sign the first hash with a cryptographic key (e.g., a private key) associated with the server device. In some embodiments, the first hash may be transmitted to each of the plurality of user devices, for example, bundled with the file system update and the manifest. In some embodiments, the first hash may be transmitted separately from the file system update and/or the manifest. As described further herein, the first hash may be used by each of the plurality of user devices to verify the integrity of the metadata records of updated metadata of the respective file system.

In some embodiments, and, continuing with the above illustration, a representative user device of the plurality of user devices may receive a bundle containing the file system update and the reference manifest. The user device may then install (e.g., perform) the file system update. As part of (and/or parallel to) installing the file system update, the user device may generate metadata ("second metadata") that is associated with the on-disk file system of the user device. For example, the user device may install (and/or update) a first file and a second file to the disk (e.g., a solid state disk (SSD)). In some embodiments, the installation process may be performed in a non-deterministic fashion (e.g., using parallel processes), whereby it may not be known in advance which file may be installed first (e.g., the first file or the second file). For example, in some embodiments, the installation process may be subject to race conditions. Upon installing a file, one or more metadata records may be generated. In some embodiments, a value of a field for a metadata record may be determined based in part on the time the particular file was installed (e.g., which may be ordered relative to other file installations). Accordingly, value(s) associated with a metadata record for the first file may differ, depending on whether the first file was installed before or after the second file. It should be understood that, although the file itself (e.g., the file name and the content in the file) may be the same for each user device installing the update, the metadata associated with each file (or, more generally, each file system object) may vary depending, non-deterministic factors. Accordingly, the generated metadata for each user device may be different, even though each user device may install the same file system update package. In some embodiments, as part of generating the metadata for each user device, the user device may insert a newly generated metadata record into a tree data structure (e.g., a B-tree) associated with the on-disk file system (e.g., similar to as described above, in reference to the server device). In some embodiments, the second metadata of the on-disk file system may thus be represented by the tree data structure on the user device.

In some embodiments, following the generating of second metadata based in part on performing the file system update, the user device may compare metadata records of the first metadata (e.g., of the reference manifest) with metadata records of the second metadata. For example, the user device may determine, for at least one metadata record of the first metadata of the reference manifest, that a value of a field of the metadata record is different from a value of a field of another metadata record of the second metadata. The user device may then generate a dictionary entry and add the entry to the dictionary. In some embodiments, the dictionary entry may include an entry key and an entry value. An entry key may correspond to a value (e.g., an inode number) of a field (e.g., an object identifier field) of the metadata record (e.g., an inode record) of the second metadata (i.e., the on-disk metadata) that was determined to be different from the value of the field of the other metadata record of the first metadata (of the reference manifest). Meanwhile, the entry value may correspond to the value of the field of the other corresponding metadata record of the first metadata. In this way each entry of a plurality of entries of the dictionary may indicate a difference between one of the metadata records of the on-disk file system metadata and the reference manifest. In some embodiments, the dictionary may be represented in any suitable data structure (e.g., a table), whereby a lookup in the dictionary may be performed in O(1) time.

In some embodiments, following user device generating the dictionary that captures differences between the on-disk file system metadata (the "second metadata") and the reference manifest metadata (the "first metadata"), the user device may update the second metadata of the file system to match the first metadata based in part on differences captured by the dictionary. For example, the user device may update the second metadata by executing a process that traverses an existing tree data structure that was generated as a result of installing the file system update (e.g., representing the second metadata of the on-disk file system). As the process traverses the tree, the process may locate a particular node of the tree (e.g., a particular leaf node). The process may determine that a metadata record associated with the particular node is associated with a particular entry of the dictionary. For example, the process may determine that a value of a field of the metadata record associated with the particular node matches a particular entry key of a particular entry of the dictionary. The process may then generate a new metadata record that includes the associated particular entry value of the particular entry (e.g., instead of the particular entry key). In some embodiments, the process may then insert the new metadata record into a new tree data structure associated with the updated second metadata of the file system. Accordingly, after traversing the entire existing tree data structure (associated with the second metadata), comparing each metadata record of the tree nodes to determine if an associated dictionary entry exists, generating a new metadata record if a dictionary entry is found, and then inserting the new metadata record into a new tree data structure (associated with the updated second metadata), the fully generated new tree data structure will correspond to the updated second metadata. In some embodiments, instead of generating a new tree data structure, the process may insert the new metadata record into the existing tree data structure. For example, in some embodiments, the tree data structure may be enabled to temporarily accommodate duplicate entries, and then a process may later traverse the tree to remove older entries. In this embodiment, the existing tree data structure may be updated to correspond to the updated second metadata. In any case, whether an entirely new data structure is generated or an existing data structure is updated, the final updated (or new) data structure may correspond to the updated second metadata that matches (e.g., is consistent with)) the first metadata associated with the reference manifest).

In some embodiments, following the updating of the second metadata of the file system, the user device may then verify the integrity of the updated second metadata. For example, the user device may have received the first hash from the server device (e.g., as part of the bundle) that is associated with the first metadata (of the reference manifest). The user device may determine a second hash for the updated second metadata in a similar fashion as was performed on the server device to generate the first hash. For example, the user device may generate the second hash based on computing a hash value of a root node of the newly generated tree data structure corresponding to the updated second metadata. The user device may then verify that the updated second metadata is accurate (e.g., no bit flips and/or data corruption is present) based on comparing the first hash with the second hash. In some embodiments, the user device may first verify the signature of the first hash by using a public key associated with the server device (that corresponds to the private key used by the server device to sign the first hash). In this way, the user device may be able to ensure both the authenticity and the data integrity of the metadata associated with the on-disk file system following the update.

It should be understood that each user device of the plurality of user devices that receives the bundle (e.g., including the file system update, the reference manifest, and/or the signed first hash) may be able to perform a similar process as the representative user device described above. For example, each user device may generate the same (e.g., substantially identical) hash value (e.g., because the updated metadata records are the same for each device, based on the reference manifest), and then compare the generated hash with the first hash. Accordingly, embodiments may ensure consistent file system metadata across the plurality of user devices (e.g., upon performing a file system update).

In some embodiments, subsequent to updating the second metadata of the file system, the user device may determine if any unexpected (e.g., unauthorized) metadata modifications (e.g., bit flips and/or data corruptions) have occurred. For example, the user device may have previously stored the reference manifest that includes the first metadata. In some embodiments, the user device may then use the reference manifest to determine if any data corruption has occurred. For example, the user device may iterate through a current tree data structure and compare each metadata record to reference metadata records associated with the first metadata of the reference manifest. If a difference is found, the user device may determine that a particular metadata record of the current metadata is associated with an unexpected metadata modification (e.g., a bit corruption). The user device may then correct the bit corruption by updating the particular metadata record to match an associated metadata record of the first metadata of the reference manifest. In some embodiments, any suitable technique may be used to perform this comparison (e.g., performing a "diff" of a metadata volume, generating a reference tree data structure from the reference manifest, etc.). In any case, because embodiments may ensure that metadata is consistent across computing devices (e.g., the expected metadata is deterministic on each user device), identifying particular unexpected metadata changes and correcting the errors on a particular device may be performed more efficiently than using conventional techniques (e.g., which may require cross-referencing metadata records and/or performing a series of computations to determine the correct metadata value for that user device).

In some embodiments, based in part on metadata of the file system being deterministically determined to match the reference manifest, the metadata for a particular volume may be classified as immutable. Accordingly, a volume of a particular user device may be divided into an immutable region that is separate from a mutable region. The immutable region may store the immutable metadata, while the mutable region may store files that are subject to change (e.g., deletion, file name change, etc.). In some embodiments, a file system layer of the user device may restrict writes to the immutable region of the metadata to prevent any unauthorized metadata manipulation. Also, underlying hardware of the user device can provide an additional layer of security by locking down the immutable region and rejecting writes to that region.

In some embodiments, because the user device may ensure that an immutable region of the volume (containing the metadata of the file system) is not changing, the user device may enabled improved disk longevity. For example, consider a case where a user device utilizes an SSD. Typically, SSDs perform writes to pages of a region (and erase data in blocks). Accordingly, if the metadata was mutable, there would be increased volatility among pages that store the metadata. However, embodiments may now indicate to the SSD that an immutable region storing the metadata will not change. This may reduce volatility and enhance the lifespan of the SSD. For example, a flash translation layer (FTL) of the SSD may determine to reduce (e.g., eliminate) performing one or more tasks associated with the immutable region, including, for example, garbage collection and/or wear leveling on the SSD.

The embodiments of the present disclosure provide several technical advantages over existing systems. For example, embodiments enable a user device to more efficiently verify the integrity of the metadata of the on-disk file system after performing a system update. As described herein, this is enabled in part because the first hash generated by the server device and the second hash generated by the user device may be the same after updating the second metadata of the file system. Furthermore, because the on-disk metadata is the same across all user devices (e.g., that receive and install the bundle including the file system update and the manifest), the server device can more efficiently enable the integrity of the metadata on a wide range of user devices (e.g., since each device is aligning to the same hash value generated by the server device). Additionally, embodiments enable more efficient detection and correction of unexpected (e.g., unauthorized) metadata modifications that happen subsequent to performing the update installation. For example, a user device may more efficiently detect a bit flip or data corruption by comparing the current metadata (e.g., the existing tree data structure) against the reference manifest. It should be understood that the reference manifest may be updated (e.g., replaced) as the server device may send subsequent system update packages to the user devices, in which case each user device may correspondingly update the on-disk file system metadata. In another example, because the on-disk metadata of a user device is now aligned with the reference manifest, the user device may determine that the metadata should not be allowed to be modified by a user, and therefore may classify (e.g., mark) the metadata as read-only. This may enable the user device to divide (e.g., partition) the disk volume to have a mutable region and immutable region, whereby the immutable region contains at least the read-only metadata. As described herein, this may further improve security by protecting against attacks to the metadata, as well as increasing the longevity (e.g., lifespan) of the disk hardware (e.g., an SSD) by applying improved heuristics on the immutable region (e.g., reducing the need for performing garbage collection, wear leveling, etc.).

Figure 2:
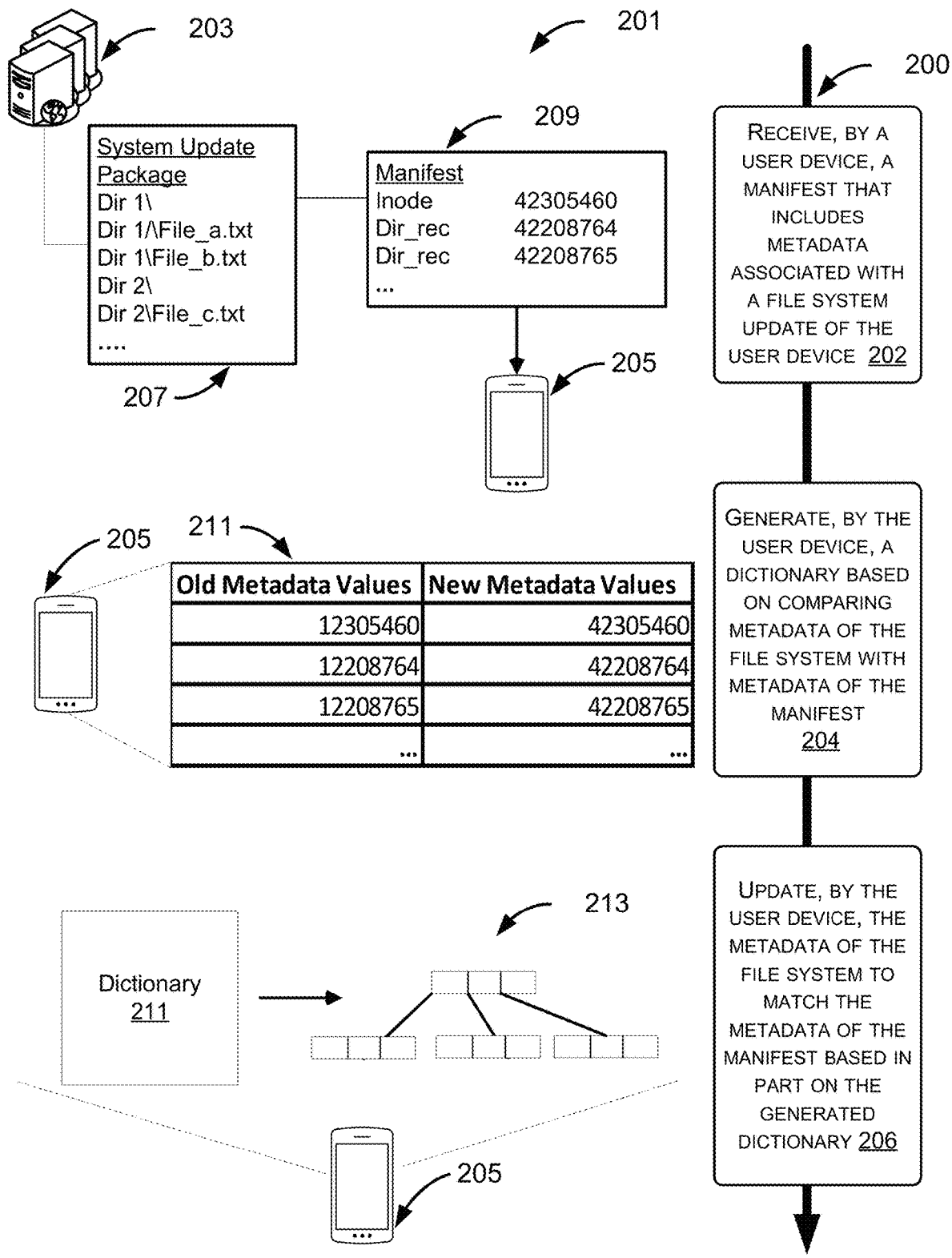
FIG. 2 is another simplified block diagram illustrating at least some example techniques for ensuring consistent metadata across computing devices, according to some embodiments.

FIG. 1 is a simplified block diagram 100 that illustrates an example environment, according to some embodiments. In FIG. 1, the example environment includes a server device 102 and a plurality of representative user devices 108, 110, and 112. The server device 102 may be associated with a service provider that may implement and/or maintain one or more operating systems, each operating system implementing a particular file system type. In the example of FIG. 2, each of the user devices 108, 110 and 112 may correspond to mobile devices (e.g., mobile phones), whereby each of the plurality mobile devices may execute the same type of file system (and/or operating system). In some embodiments, the mobile user devices 108, 110, 112 may have substantially the same disk volume (e.g., the same system volume). For example, each mobile device may contain the same number of system files whereby each system file has the same name. Although embodiments described herein may typically describe scenarios in which system data is updated (e.g., whereby the system volume is the same across user devices implementing the same OS), it should be understood that embodiments should not be construed to be so limiting. For example, embodiments may also apply to scenarios where non-system data is updated by the server device 102. For example, a user device's disk volume may also contain non-system files, whereby a user is enabled to edit the data contents of a file, but is not allowed to delete the file and/or change the name of the file (e.g., because the particular non-system files are locked down by administrative controls). Embodiments described herein may also be applied to updates for these types of contents and/or any suitable file system object types, whereby the system may guarantee that the file system objects (e.g. user files, system files) remain the same on the system (e.g., the files exist with the same filename).

Turning to the illustration of FIG. 1 in further detail, in some embodiments, the server device 102 may generate a file system update 104. In some embodiments, the file system update 104 may correspond to any suitable update for a computing device that updates an aspect of the file system for the type of computing device. For example, the file system update 104 may correspond to an update for one or more system directories, each system directory having zero or more system files. The file system update 104 may add, remove, and/or update one of these system directories and/or system files. In the example of FIG. 1, the file system update 104 may include at least two new directories ("Dir 1" and "Dir 2"). "Dir 1" may include two files ("File_a.txt" and "File_b.txt"). Similarly "Dir 2" may include at least "File_c.txt." It should be understood that any suitable number and/or combination of files and/or directories may be included in a file system update used to perform embodiments described herein. For example, the update package may update every system file and/or directory ("folder").

Upon generating the file system update 104, the server device 102 may also generate a manifest 106 (e.g., a reference manifest file) that includes first metadata associated with the file system update 104. For example, as depicted in FIG. 1, the first metadata of manifest 106 includes metadata records for at least the "Dir 1" of the file system update 104. For example, a first "Inode" metadata record may include at least an "object identifier" field, among other possible fields. In a non-limiting example of possible fields for the "Inode" metadata record, the fields may include a "create time" field, a "modification time" field, a "parent identifier" field, an "internal flags" field, etc. It should be understood that any suitable number and/or type of fields may be utilized for any given metadata record. Turning back to manifest 106, the "object identifier" field (or "obj_id") of the "Inode" metadata record is "42305460," which may be a unique value that distinguishes the "Dir 1" inode from other inodes. For clarity of explanation, in some embodiments, an "inode" may be a data structure that describes a file system object such as a file or directory. In some embodiments, depending on the type of field, a value of a field may be unique (e.g., in the case of an "object identifier" field), while, in other cases, the value of a field may not be unique. For example, two inode records may share the same parent (e.g., having a same parent identifier field value). Additionally, as the "Dir 1" of the file system update 104 contains two files, there may be directory metadata records (i.e., "Dir_rec") for each file within "Dir 1." As depicted in FIG. 1, the object identifier for the directory metadata record for "File_a.txt" may be "42208764," while the object identifier for the directory metadata record for "File_b.txt" may be "42208765." Together, these three metadata records may correspond to the file system object of the "Dir 1" of the file system update 104. Similarly, the "File_a.txt" may have its own set of one or more associated metadata records (e.g., an inode metadata record, a sibling link metadata record, etc.), and so forth, for each object of the file system being updated (e.g., "File_b.txt", "Dir_2," "File_c.txt," etc.). It should be understood that any suitable number of metadata records may exist for a particular type of file system object. Also, a particular metadata record may have a particular type of a plurality of possible record types, including, by way of example only, a directory record, an inode record, a symbolic link record, an extended attributes record, a file extent record, etc. As described herein, the types of metadata records may vary, depending on the file system type. Also, the layout of files and directories for the update may vary, depending on the type of operating system and/or type of computing device being updated. The metadata included in the manifest 106 may be organized in any suitable way, including, but not limited to, a list of metadata records, a table of records, etc. In some embodiments, the metadata information included in the manifest 106 may represent metadata for even more than the files and/or directories being updated in the file system update 104. For example, the metadata represented in the manifest 106 may represent metadata for the entire system volume, or any suitable portion(s) of the on-disk file system.

In some embodiments, as described further herein, the server device 102 may generate a hash value (e.g., a "first hash") associated with the first metadata of the manifest 106. For example, the server device 102 may generate a tree data structure (e.g., a B-tree), and compute a hash value of a root node of the tree data structure, which represents (e.g., captures) the respective hash values of the metadata records represented by different children nodes of the tree. In some embodiments, the first hash may be included within the manifest 106, or otherwise included in a bundle that includes the file system update 104 and/or the manifest 106. In some embodiments, the first hash may be transmitted separately from either of these elements to one or more user devices. As described herein, the first hash may be later used by a user device to verify the integrity of an update on the particular user device.

In some embodiments, the server device 102 may transmit the file system update 104 to at least one user device of the plurality of user devices. For example, the server device 102 may transmit the file system update 104 to the representative user devices 108, 110, and 112. Each device may install the update, which, in this example, may include installing (and/or updating) the directories and files with the file system update 104. Each user device may generate metadata ("second metadata") based at least in part on performing the file system update by installing file system update 104. For example, user device 108 may generate second metadata 114, user device 110 may generate second metadata 116, and user device 112 may generate second metadata 118.

Focusing on the second metadata of representative user device 108 in further detail, and, using the metadata records associated with the "Dir 1" file system object as a representative example, the second metadata 114 generated may include metadata records for the "Dir 1" object, including an Inode metadata record and two Directory metadata records (e.g., corresponding to the two files within "Dir 1"). As described above, each metadata record may have a unique object identifier. For example, the Inode object identifier field may have a value of "12305460," the directory metadata record for "File_a.txt" may have an object identifier field value of "12208764," and the directory metadata record for "File_b.txt" may have an object identifier field value of "12208765." Note that, although the user device 108 installs the same files and directories (e.g., "Dir 1," "File_a.txt," "File_b.txt," etc.), the metadata associated with the different files and directories may be different. For example, the inode object identifier field value of manifest 106 is "42305460," whereas the inode object identifier field value of the second metadata 114 is a different value (i.e., "12305460"). Similarly, the directory record object identifier field values for the second metadata 114 also are different from the corresponding values in the manifest 106. As described herein, this may be due in part to the installation process being non-deterministic. For example, both "File_a.txt" and "File_b.txt" may be installed in parallel (e.g., parallel executing threads). In some embodiments, a value of a field (e.g., an object identifier field) of a metadata record (e.g., an inode record) may be determined based in part on when the particular file is done installing. Accordingly, the values of the fields of metadata records may be non-deterministic, for example, based on race conditions and/or other factors, and thus, may different between user devices that have installed the same update. This is depicted, for example, in the corresponding second metadata 116 and 118 of the respective user devices 110 and 112. For example, the inode object identifier field value is "22305460," which is different from the respective values of both of the other user devices 108 and 112, as well as being different from the corresponding value in the manifest 106 ("42305460").

In some embodiments, and as described further herein (e.g., with respect to FIG. 2), each of the user devices may perform a process to achieve consistent metadata that matches the metadata information in the manifest 106 (i.e., the "reference manifest"). Accordingly, at the end of this process, for example, the metadata for the "Dir 1" object will be consistent across each of the user devices 108, 110, and 112, and may align with the metadata information of manifest 106. In some embodiments, each user device may verify the integrity of the process to achieve consistent metadata by generating a hash (a "second hash") on the respective user device, and then comparing the second hash with the first hash that was received from the server device by each respective user device.

FIG. 2 is another simplified block diagram depicting an example process performed by a system, according to some embodiments of the present disclosure. The process 200 is an example high-level process performed by a system (e.g., one of the representative user devices 108, 110, and/or 112 of FIG. 1) to achieve metadata that is consistent with metadata of a reference manifest received from a server device. The diagram 201 depicts example states that correspond to blocks of the process 200. The diagram 201 may include elements that are similar to those depicted in reference to FIG. 1. For example, a server device 203 may be similar to the server device 102 of FIG. 1, a user device 205 may be similar to one of the user devices of FIG. 1 (e.g., user device 108), a file system update 207 (e.g., bundled in an installable package) may be similar to file system update 104, and a manifest 209 may be similar to the manifest 106.

Turning to the process 200 in further detail, at block 202, the system may receive a manifest (i.e., a reference manifest) that includes metadata ("first metadata") associated with a file system update of the user device. For example, as described herein, the user device 205 may receive the file system update 207 and the associated reference manifest 209 from the server device 203. The file system update 207 and the manifest 209 may be bundled together, or may be received separately. Also, in some embodiments, the user device 205 may also receive a hash (e.g., a "first hash" value) from the server device 203. The first hash may be associated with metadata of the reference manifest. In some embodiments, the first hash may be signed (e.g., encrypted) with a cryptographic key (e.g., a private key) associated with the server device 203. In this way, the user device 205 may verify the authenticity of the hash (e.g., using a corresponding public key of the server device 203).

At block 204, the system may generate a dictionary based on comparing metadata of the file system with metadata of the reference manifest. For example, the user device 205 may first install the file system update 207. As described herein, in association with installing the file system update 207, the user device 205 may generate metadata ("second metadata"). For example, the user device 205 may generate a tree data structure (e.g., a B-tree) that represents the second metadata, whereby nodes of the tree data structure may store metadata record information associated with file system objects of the file system of the user device 205. As an example, one of the file system objects represented within this tree data structure may correspond to the "Dir 1" object of second metadata 114 of FIG. 1. In some embodiments, any suitable data structure may be used.

The user device 205 may then iterate through the second metadata (e.g., traversing the tree data structure) and compare metadata records of the second metadata with metadata records captured by the first metadata of the reference manifest. If the user device 205 determines that a value of a field of at least one metadata record of the second metadata (e.g., Inode object identifier field value "12305460" of second metadata 114) differs from a value of a field of at least one metadata record of the first metadata (e.g., "Inode object identifier field value "42305460" of the reference manifest 209), the user device 205 may generate a new dictionary entry (e.g., a key/value pair) to be added to a dictionary 211. For example, as depicted in the dictionary 211, a first entry may include an entry key and an entry value. The entry key may correspond to "old" metadata values (e.g., from the second metadata), and the entry value may correspond to "new" metadata (e.g., from the reference manifest). In some embodiments, the presence of an entry in the dictionary 211 may imply that the old metadata value for the corresponding metadata record needs to be replaced with a corresponding new metadata value that aligns with the reference manifest 209. In some embodiments, because the dictionary 211 may be a represented in a tabular data structure (e.g., a set of key/value pairs), the dictionary 211 may be responsive to look-ups in O(1) time (e.g., providing quick look up times). It should be understood that the dictionary 211 may be generated and/or stored in any suitable data structure (e.g., a database).

At block 206, the system may update the metadata of the on-disk file system to match the metadata of the reference manifest based in part on the generated dictionary. For example, as described above, the user device 205 may have already generated a tree data structure that represents the second metadata from the installed file system update 207. The user device 205 may then traverse the existing tree structure to locate a particular node (e.g., a leaf node). The user device 205 may examine a metadata record associated with the particular node, and determine if the metadata record is also associated with a particular entry (e.g., a particular entry key) in the dictionary 211. If so, then the user device 205 may determine that the particular metadata record for the existing tree data structure (e.g., the leaf node) needs to be updated. In one embodiment, the user device 205 may generate a new metadata record that includes updated metadata values based on the associated entry value of the dictionary entry (e.g., which was determined based on the reference manifest 209 at block 204). The user device 205 may then insert the new metadata record into a new tree data structure 213 that corresponds to an updated second metadata of the file system. In this way, the user device 205 may iterate through the entire existing tree data structure, compare each metadata record to determine if a matching dictionary entry exists, and, if so, generate a new metadata record and further populate the new tree data structure 213 (e.g., until the new tree data structure 213 is fully constructed). At this point, the new tree data structure 213 may correspond to the updated second metadata that matches (e.g., is consistent with) the metadata records represented by the reference manifest 209. In some embodiments, instead of generating a new tree data structure, the user device 205 may update the existing tree data structure. As described herein, in some embodiments, this may include temporarily including duplicate values (e.g., duplicate metadata records) in the tree, until the iteration process is complete. In some embodiments, duplicate values and/or new values may be marked with an indication that they should be later removed. It should be understood that any suitable process and/or data structure may be used to update the second metadata.

As described above, upon generating the updated second metadata, the user device 205 may verify the integrity of the updated second metadata by comparing hash values. For example, in the case where the updated second metadata is stored in a new tree data structure, the user device 205 may generate a second hash value based on computing hashes for nodes of the new tree data structure. For example, the user device 205 may compute (and store) a hash for metadata records (e.g., metadata field values) associated with leaf nodes of the tree. Then, the user device 205 may generate and store a hash in a parent node of one or more leaf children, whereby the hash of the parent node incorporates the hash value of the children nodes. This process may continue until the user device 205 computes a hash for the root node of the tree data structure that incorporates the hashes of all the children. As described herein, it should be understood that the server device 203 may also have previously computed the first hash (e.g., bundled with the reference manifest 209) in a similar fashion. The user device 205 may then compare the second hash of the root node of the tree data structure 213 with the first hash received from the server device 203. If the hash values match, then the user device 205 may verify (e.g., confirm) the integrity of the metadata update (e.g., that the updated second metadata is accurate). As described above, in some embodiments, the user device 205 may first verify the signature of the first hash using a cryptographic key (e.g., a public key) of the server device 203. It should be understood that the process 200 may be similarly followed by other user devices that receive the updated bundle package (e.g., including the file system update 207, the reference manifest 209, and the first hash) from server device 203. Accordingly, each of the user devices may ensure consistent file system metadata upon performing the process 200. In some embodiments, as described herein, the updated second metadata may be stored in an immutable metadata region of the disk volume of the user device 205. Accordingly, writes to the immutable region may be restricted at the file system layer and/or underlying hardware layer to prevent attacks and/or corruption of metadata.

Figure 3:
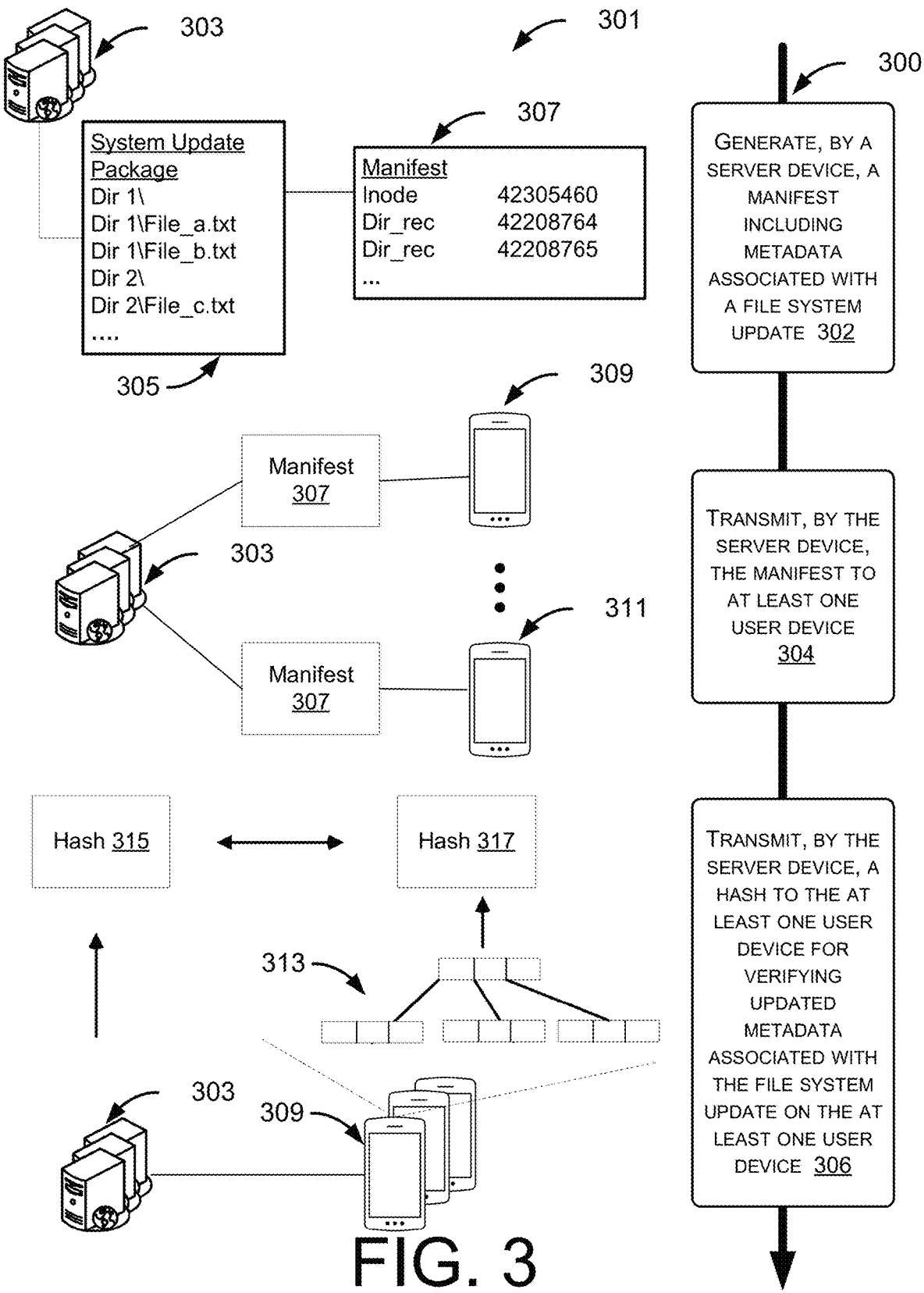
FIG. 3 is another simplified block diagram illustrating at least some example techniques for ensuring consistent metadata across computing devices, according to some embodiments.

FIG. 3 is another simplified block diagram depicting an example process performed by a system, according to some embodiments of the present disclosure. The process 300 is an example high-level process performed by a system (e.g., the server device 102 of FIG. 1) to enable a plurality of user devices to achieve identical metadata, based on each user device receiving a reference manifest associated with a file system update from the system. The diagram 301 depicts example states that correspond to blocks of the process 300. The diagram 301 may include elements that are similar to those depicted in reference to FIG. 1 and/or FIG. 2. For example, a server device 303 may be similar to the server device 102 of FIG. 1 and/or server device 203 of FIG. 1, user devices 309 and 311 may be respectively similar to user device 205 of FIG. 2 (and/or one of the user devices of FIG. 1), a file system update 305 may be similar to file system update 207, and so forth.

Turning to the process 300 in further detail, at block 302, the system may generate a reference manifest including metadata associated with a file system update. For example, the server device 303 may first generate a file system update 305 (e.g., an installable package), which includes one or more files and directories. The server device 303 may also generate an associated manifest 307 that includes first metadata associated with the file system update 305. In some embodiments, the manifest 307 may be similar to the manifest 209 of FIG. 2. The system may also generate a hash (e.g., a first hash) associated with the first metadata, similar to as described herein (e.g., utilizing a B-tree and generating a hash of the root node, which incorporates the hashes of the children nodes).

At block 304, the system may transmit the manifest to at least one user device. For example, the server device 303 may transmit the reference manifest 307 to representative user device 309 and user device 311. It should be understood that, as described above, the manifest may also be transmitted along with the file system update (e.g., in a bundle) to each of the user devices. In some embodiments, each of the user devices that receive the bundle may be selected (and/or opt) to receive the update based at least in part on having a common characteristic (e.g., executing the same OS with a particular file system type and/or system volume).

At block 306, the system may transmit the first hash to the at least one user device. In some embodiments, as described above, the first hash may be utilizable for verifying the updated metadata associated with the file system update (e.g., installed on the on-disk file system) on the at least one user device. For example, as described herein, one of the user devices that received the first hash (e.g., representative user device 309) may generate a new tree data structure 313 that corresponds to updated metadata, for example, using a similar process as described in reference to FIG. 2. The user device 309 may then generate a second hash 317 of the root of the new tree data structure 313. The user device 309 may then compare the second hash 317 with the first hash 315 to determine if they match (e.g., if the respective hash values match). If so, then the user device 309 may verify the accuracy of the updated metadata. In some embodiments, the user device 309 may return an acknowledgment message to the server device 303 to confirm the integrity of the updated metadata.

Figure 4:
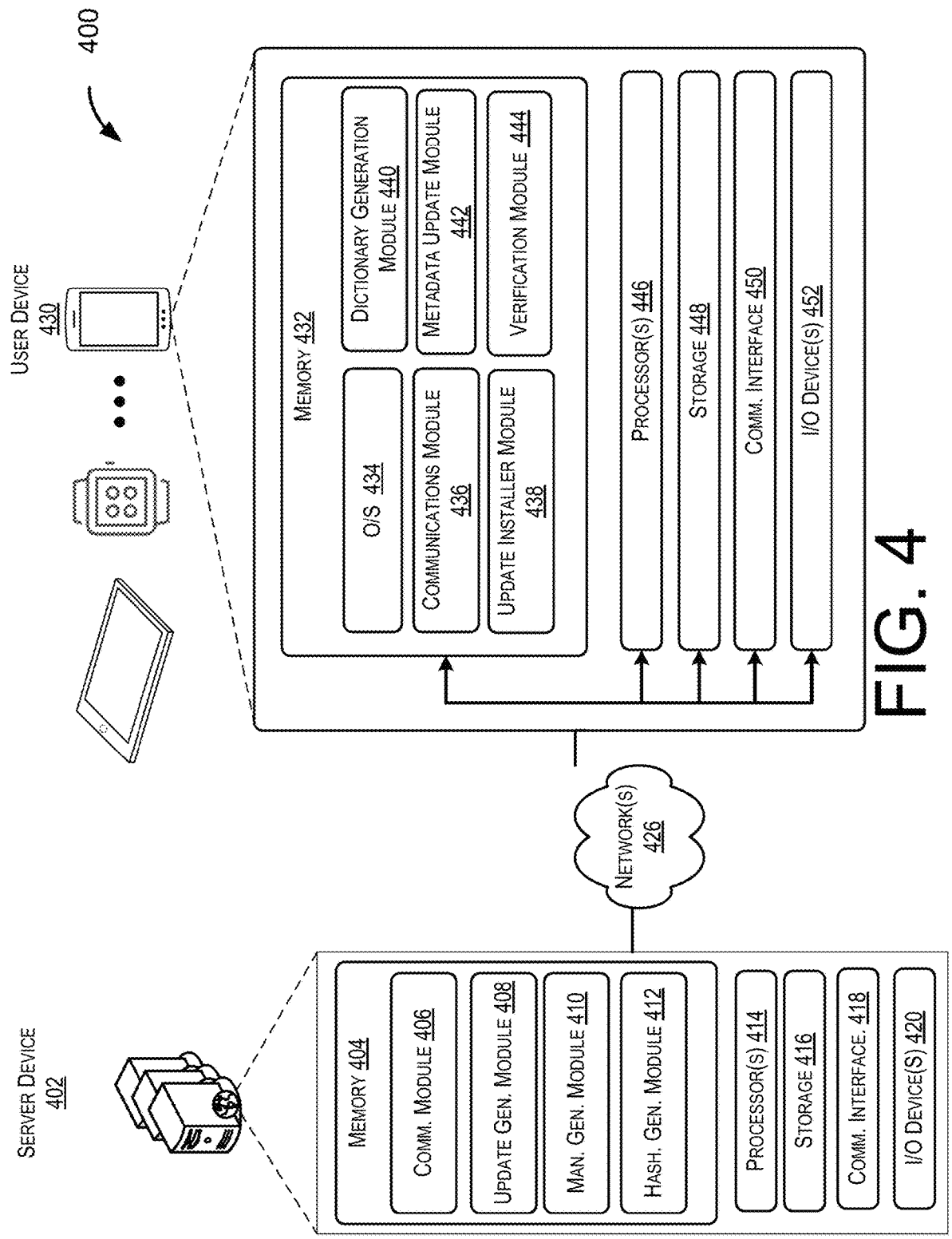
FIG. 4 is another simplified block diagram illustrating an example architecture of a system enabled to ensure consistent metadata across computing devices, according to some embodiments.

FIG. 4 is another simplified block diagram 400 illustrating an example architecture of one or more systems used to achieve consistent file system metadata across a plurality of computing devices. The diagram 400 includes a representative user device 430 (of one or more user devices), a server device 402, and one or more network(s) 426. Each of these elements depicted in FIG. 4 may be similar to one or more elements depicted in other figures described herein. For example, the user device 430 may be similar to any of the other user devices described herein, and so forth.

In some embodiments, the user device 430 may be any suitable computing device (e.g., a mobile phone, tablet, personal computer (PC), smart glasses, a smart watch, etc.). In some embodiments, a user device 430 may perform any one or more of the operations of user devices described herein. Depending on the type of user device (e.g., the type of file system, operating system, and/or device volume data), different user devices may receive different file system updates from the server device 402.

Turning to each element of user device 430 in further detail, the user device 430 has at least one memory 432, one or more processing units (or processor(s)) 446, a storage unit 448, a communications interface 450, and an input/output (I/O) device(s) 452. The processor(s) 446 may be implemented as appropriate in hardware, computer-executable instructions, firmware or combinations thereof. Computer-executable instruction or firmware implementations of the processor(s) 446 may include computer-executable or machine executable instructions written in any suitable programming language to perform the various functions described.

The memory 432 may store program instructions that are loadable and executable on the processor(s) 446, as well as data generated during the execution of these programs. Depending on the configuration and type of user device 430, the memory 432 may be volatile (such as random access memory (RAM)) and/or non-volatile (such as read-only memory (ROM), flash memory, etc.). In some implementations, the memory 432 may include multiple different types of memory, such as static random access memory (SRAM), dynamic random access memory (DRAM) or ROM. The user device 430 may also include additional storage 448, such as either removable storage or non-removable storage including, but not limited to, magnetic storage, optical disks, solid state disks (SSDs), and/or tape storage. The disk drives and their associated computer-readable media may provide non-volatile storage of computer-readable instructions, data structures, program modules, and other data for the computing devices. In some embodiments, the storage 448 may be utilized to store file system contents (e.g., data files and/or system files, and associated metadata). For example, the storage 448 may store one or more tree data structures that represent metadata associated with the on-disk file system contents.

The user device 430 may also contain the communications interface 450 that allows the user device 430 to communicate with a stored database, another computing device or server (e.g. server device 402), user terminals, and/or other devices on the network(s) 426. The user device 430 may also include I/O device(s) 452, such as for enabling connection with a keyboard, a mouse, a pen, a voice input device, a touch input device, a display, speakers, a printer, etc.

Turning to the contents of the memory 432 in more detail, the memory 432 may include an operating system 434 and one or more application programs or services for implementing the features disclosed herein, including a communications module 436, an update installer module 438, a dictionary generation module 440, a metadata update module 442, and a verification module 444. In some embodiments, any one or more of the application programs or services of user device 430 (or any other features of user devices described herein) may be used to perform embodiments described herein.

The communications module 436 may comprise code that causes the processor 446 to generate messages, forward messages, reformat messages, and/or otherwise communicate with other entities. For example, as described herein, the communications module 436 may transmit and/or receive messages to/from the server device 402 over the network 426. For example, the communications module 436 may receive one or more update packages from the server device 402, along with associated reference manifests and/or signed hashes from the server device 402. In some embodiments, each of the elements may be received in a single bundle, or as separate elements.

The update installer module 438 may comprise code that causes the processor 446 to install an update received from the server device 402. As described herein, the update may include any suitable combination of data objects, including, for example, files and directories. The update installer module 438 may also generate metadata associated with the installed update. For example, the metadata may be stored in an associated tree data structure (e.g., a B-tree) that stores metadata records of metadata associated with the updated files. It should be understood that, in some cases, the metadata that is updated for a particular on-disk file system may be associated with the entire metadata for the disk volume.

The dictionary generation module 440 may comprise code that causes the processor 446 to generate a dictionary based on comparing the on-disk file system metadata with the metadata of the reference manifest received from the server device 402. In some embodiments, one or more of the operations of this module may be similar to as described in reference to FIG. 2 (e.g., block 204).

The metadata update module 442 may comprise code that causes the processor 446 to update the on-disk file system metadata to be consistent with (i.e., to match) the metadata of the reference manifest. In some embodiments, one or more of the operations of this module may be similar to as described in reference to FIG. 2 (e.g., block 206).

The verification module 444 may comprise code that causes the processor 446 to verify the integrity of the metadata update. For example, the user device 430 may receive a signed first hash associated with the reference manifest from the server device 402. The user device 430 may first verify an authenticity of a signature of the first hash based on using a cryptographic key (e.g., a public key) associated with the server device 402. Then the user device 430 may compare the first hash against a second hash that was computed against a root node of a tree data structure that stores the updated metadata of the on-disk file system.

In some embodiments, the network 426 may include any suitable communication path or channel such as, for instance, a wire or cable, fiber optics, a telephone line, a cellular link, a radio frequency (RF) link, a WAN or LAN network, the Internet, or any other suitable medium. The network 426 may include any one or a combination of many different types of networks, such as cable networks, the Internet, wireless networks, cellular networks, and other private and/or public networks.

Turning to the server device 402 in further detail, the server device 402 may include elements that are similar to (or different from) the user device 430. For example, the server device 402 may contain a memory 404, one or more processing units (or processor(s)) 414, a storage unit 416, a communications interface 418, and an input/output (I/O) device(s) 420.

Turning to the contents of the memory 404 in more detail, the memory 404 may include an operating system and one or more application programs or services for implementing the features disclosed herein, including a communications module 406, an update generation module 408, a manifest generation module 410, and a hash generation module 412. In some embodiments, any one or more of the application programs or services of server device 402 (or any other features of server devices described herein) may be used to perform embodiments described herein.

The communications module 406 may comprise code that causes the processor 414 to generate messages, forward messages, reformat messages, and/or otherwise communicate with other entities. For example, the communications module 406 may transmit and/or receive messages to/from one or more user devices (e.g., user device 430) over the network 426. For example, the communications module 406 may transmit one or more update packages along with respectively associated reference manifests and/or signed hashes. The communications module 406 may also receive acknowledgement messages from respective user devices to confirm that the integrity for the updated metadata for the user device was verified.

The update generation module 408 may comprise code that causes the processor 414 to generate an update (e.g., a file system update) for installation by one or more user devices. In some embodiments, the update may include one or more data objects (e.g., files, directories, etc.), and the update may be bundled into a installable package.

The manifest generation module 410 may comprise code that causes the processor 414 to generate an associated reference manifest for a particular file system update. In some embodiments, one or more of the operations of this module may be similar to as described in reference to FIG. 3 (e.g., block 302).

The hash generation module 412 may comprise code that causes the processor 414 to generate an associated hash for substantially all the metadata associated with a particular reference manifest. In some embodiments, one or more of the operations of this module may be similar to as described in reference to FIG. 3 (e.g., block 302 and/or 306).

Figure 5:
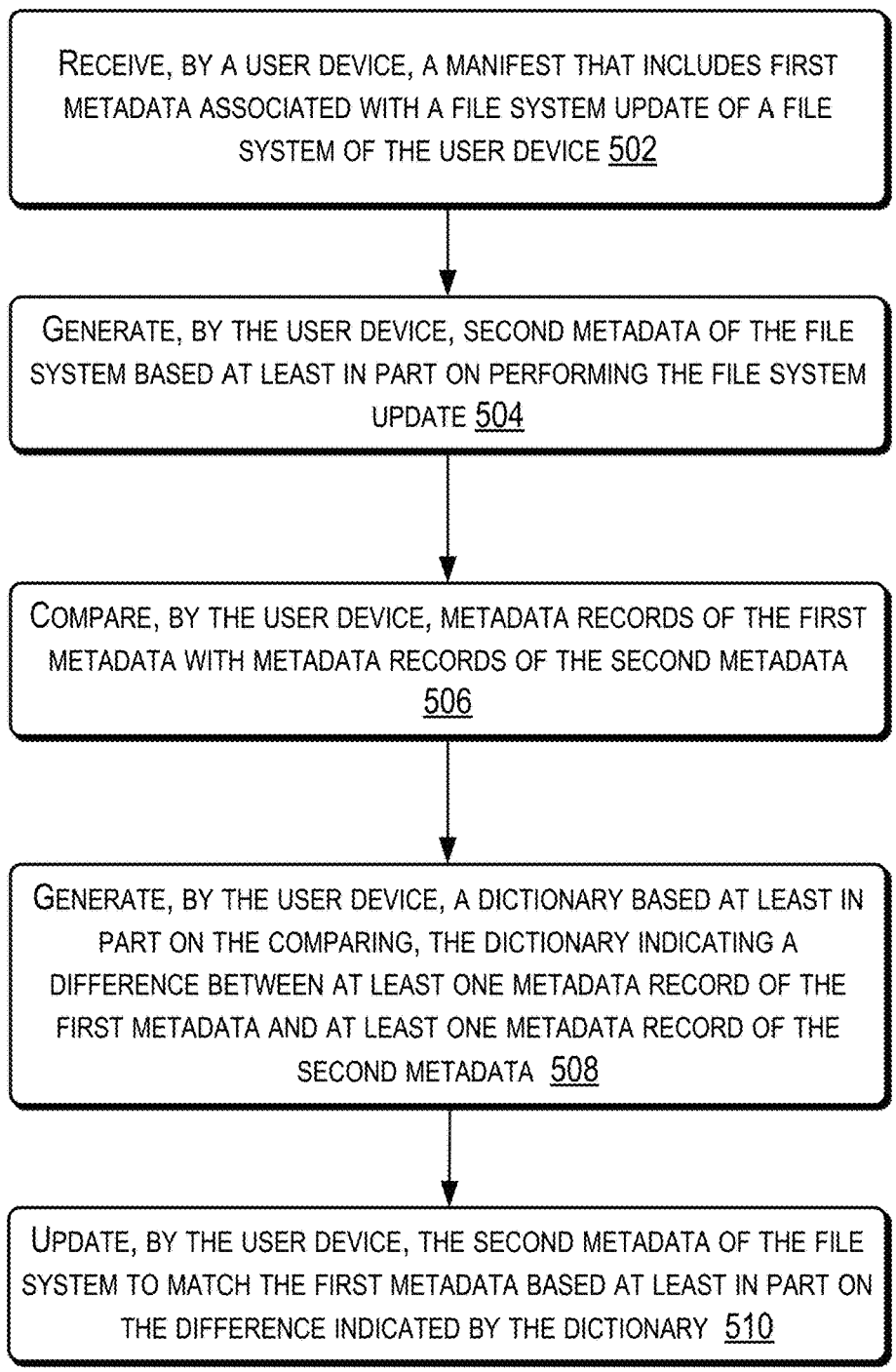
FIG. 5 is a simplified flow diagram illustrating an example process for ensuring consistent metadata across computing devices, according to some embodiments.

FIG. 5 is a simplified flow diagram illustrating an example process 500 for updating metadata of a file system to match metadata of a reference manifest, according to some embodiments. In some embodiments, process 500 may be performed by a user device and process 600 may be performed by a server device, which may, respectively correspond to any one or more of the user devices and/or server devices described herein. In some embodiments, one or more of the operations of process 500 may be similar to as described in reference to FIG. 2. In some embodiments, one or more of the operations of process 600 may be similar to as described in reference to FIG. 3.

Process 500 and process 600 of FIG. 6 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 502, a user device may receive a manifest that includes first metadata associated with a file system update of a file system of the user device. In some embodiments, one or more of the operations of block 602 may be similar to one or more operations described in reference to block 202 of FIG. 2.

At block 504, the user device may generate second metadata of the file system based at least in part on performing the file system update. In some embodiments, one or more of the operations of block 504 may be similar to one or more operations described in reference to block 204 of FIG. 2.

At block 506, the user device may compare metadata records of the first metadata with metadata records of the second metadata. In some embodiments, one or more of the operations of block 506 may be similar to one or more operations described in reference to block 204 of FIG. 2.

At block 508, the user device may generate a dictionary based at least in part on the comparing (of block 504). The dictionary may indicate a difference between at least one metadata record of the first metadata and at least one metadata record of the second metadata. In some embodiments, one or more of the operations of block 506 may be similar to one or more operations described in reference to block 204 of FIG. 2.

At block 510, the user device may update the second metadata of the file system to match the first metadata based at least in part on the difference indicated by the dictionary. In some embodiments, one or more of the operations of block 506 may be similar to one or more operations described in reference to block 206 of FIG. 2.

FIG. 6 is another simplified flow diagram illustrating an example process for transmitting metadata to one or more user devices for use by each user device in updating the on-disk file system metadata of the respective user devices.

At block 602, a server device may generate a manifest (i.e., a reference manifest) that includes first metadata associated with a file system update, whereby the file system update may be applicable to a plurality of user devices. In some embodiments, one or more of the operations of block 602 may be similar to one or more operations described in reference to block 302 of FIG. 3.

At block 604, the server device may transmit the manifest to at least one user device of the plurality of user devices. The manifest may be utilizable for updating metadata of a file system of the at least one user device. In some embodiments, one or more of the operations of block 604 may be similar to one or more operations described in reference to block 304 of FIG. 3.

At block 606, the server device may generate a first hash associated with the first metadata associated with the file system update. In some embodiments, one or more of the operations of block 606 may be similar to one or more operations described in reference to block 302 or 306 of FIG. 3.

At block 608, the server device may transmit the first hash to the at least one user device, whereby the first hash is utilizable for verifying the updated metadata of the file system of the at least one user device. In some embodiments, one or more of the operations of block 608 may be similar to one or more operations described in reference to block 306 of FIG. 3.

Illustrative techniques for ensuring consistent metadata across computing devices are described above. Some or all of these techniques may, but need not, be implemented at least partially by architectures such as those shown at least in FIGS. 1-6 above. While many of the embodiments are described above with reference to server devices and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of metadata of an on-disk file system. The present disclosure contemplates that in some instances, this gathered metadata may be (e.g., initially, prior to being updated) associated with personally identifiable information (PII) data (e.g., associated with a particular installation update on a particular user device). Such personal information data can include demographic data, location-based data (e.g., GPS coordinates), telephone numbers, email addresses, Twitter ID's, home addresses, or any other identifying or personal information.

The present disclosure recognizes that the use of such personal information data, in the present technology, can be used to the benefit of users. For example, the metadata may be used to manage the file system of a particular user device.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of services related to performing facial recognition, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
receiving, by a user device and from a server device, a manifest that includes first metadata associated with a file system update of a file system of the user device;
generating, by the user device, second metadata of the file system based at least in part on performing the file system update;
comparing, by the user device, metadata records of the first metadata with metadata records of the second metadata;
generating, by the user device, a dictionary based at least in part on the comparing, the dictionary indicating a difference between at least one metadata record of the first metadata and at least one metadata record of the second metadata; and
updating, by the user device, the second metadata of the file system to match the first metadata based at least in part on the difference indicated by the dictionary, wherein updating the second metadata of the file system comprises:
traversing an existing tree data structure to locate a particular node, the existing tree data structure representing the second metadata of the file system;
determining that a metadata record associated with the particular node is also associated with a particular entry of the dictionary, the particular entry including a particular entry key and a particular entry value, the metadata record being associated with the particular entry based at least in part on a value of a field of the metadata record matching the particular entry key; and
generating a new metadata record that includes the particular entry value instead of the particular entry key.

2. The method of claim 1, further comprising:
receiving, by the user device from the server device, a first hash associated with the first metadata;
determining, by the user device, a second hash for the updated second metadata; and
verifying, by the user device, that the updated second metadata is accurate based at least in part on comparing the first hash with the second hash.

3. The method of claim 2, wherein the second metadata of the file system is represented by a tree data structure, and wherein the second hash is generated based at least in part on computing a hash value of a root node of the tree data structure.

4. The method of claim 3, wherein the hash value of the root node is computed based at least in part on computing a plurality of hash values of respective child nodes of the root node of the tree data structure.

5. The method of claim 1, wherein the file system of the user device is of a particular type of a plurality of file system types, the particular type associated with the metadata records of the first metadata associated with the file system update.

6. A user device, comprising:
a memory configured to store computer-executable instructions; and
one or more processors in communication with the memory and configured to access the memory and execute the computer-executable instructions to at least:
receive, from a server device, a manifest that includes first metadata associated with a file system update of a file system of the user device;
generate second metadata of the file system based at least in part on performing the file system update;
compare metadata records of the first metadata with metadata records of the second metadata;
generate a dictionary based at least in part on the comparing, the dictionary indicating a difference between at least one metadata record of the first metadata and at least one metadata record of the second metadata; and
update the second metadata of the file system to match the first metadata based at least in part on the difference indicated by the dictionary, wherein the instructions to update the second metadata of the file system comprise additional instructions to:
traverse an existing tree data structure to locate a particular node, the existing tree data structure representing the second metadata of the file system;
determine that a metadata record associated with the particular node is also associated with a particular entry of the dictionary, the particular entry including a particular entry key and a particular entry value, the metadata record being associated with the particular entry based at least in part on a value of a field of the metadata record matching the particular entry key; and
generate a new metadata record that includes the particular entry value instead of the particular entry key.

7. The user device of claim 6, wherein each metadata record of the first metadata has a particular type of a plurality of record types, the plurality of record types including at least one of: a directory record, an inode record, a symbolic link record, an extended attributes record, or a file extent record.

8. The user device of claim 6, wherein a metadata record of the metadata records includes at least one metadata field, the at least one metadata field determined based at least in part on a type of the metadata record and having a particular assigned value.

9. The user device of claim 6, wherein the dictionary includes a plurality of entries, and wherein an entry of the dictionary includes an entry key and an entry value, the entry key corresponding to a value of a field of the at least one metadata record of the second metadata, and the entry value corresponding to a value of a field of the at least one metadata record of the first metadata.

10. The user device of claim 6, wherein the instructions to update the second metadata of the file system further comprise more instructions to insert the new metadata record into a new tree data structure associated with the updated second metadata of the file system.

11. The user device of claim 6, wherein the one or more processors further execute the instructions to at least:
determine, subsequent to updating the second metadata of the file system, that a particular metadata record of current metadata of the file system is associated with a bit corruption, the determining based at least in part on comparing the first metadata of the manifest with the current metadata; and
correct the bit corruption by updating the particular metadata record to match an associated metadata record of the first metadata of the manifest.

12. The user device of claim 6, wherein a first hash associated with the first metadata is received by the user device from the server device, the first hash being signed with a cryptographic key associated with the server device.

13. The user device of claim 6, wherein the one or more processors further execute the instructions to at least:
store, to a solid state disk (SSD), the updated second metadata of the file system to a metadata region of the solid state disk that is separate from a data region, the metadata region being classified as read-only.

14. One or more computer-readable storage media comprising computer-executable instructions that, when executed by one or more processors of a user device, cause the one or more processors to perform operations comprising:
receiving, from a server device, a manifest that includes first metadata associated with a file system update of a file system of the user device;
generating second metadata of the file system based at least in part on performing the file system update;
comparing metadata records of the first metadata with metadata records of the second metadata;
generating a dictionary based at least in part on the comparing, the dictionary indicating a difference between at least one metadata record of the first metadata and at least one metadata record of the second metadata; and
updating the second metadata of the file system to match the first metadata based at least in part on the difference indicated by the dictionary, wherein updating the second metadata of the file system comprises:
traversing an existing tree data structure to locate a particular node, the existing tree data structure representing the second metadata of the file system;
determining that a metadata record associated with the particular node is also associated with a particular entry of the dictionary, the particular entry including a particular entry key and a particular entry value, the metadata record being associated with the particular entry based at least in part on a value of a field of the metadata record matching the particular entry key; and generating a new metadata record that includes the particular entry value instead of the particular entry key.

15. The one or more computer-readable storage media of claim 14, wherein the user device is one of a plurality of user devices, each user device of the plurality of user devices having a same file system type.

16. The one or more computer-readable storage media of claim 15, wherein the file system update is associated with a set of files, and wherein at least (1) a number of the set of files and (2) a name of each file of the set of files is common to each of the plurality of user devices.

17. The one or more computer-readable storage media of claim 15, wherein the file system update is installed on each of the plurality of user devices, and wherein the updated second metadata of the file system of the user device matches updated metadata on each of the plurality of user devices.

18. The one or more computer-readable storage media of claim 14, wherein the dictionary includes a plurality of entries, and wherein an entry of the dictionary includes an entry key and an entry value, the entry key corresponding to a value of a field of the at least one metadata record of the second metadata, and the entry value corresponding to a value of a field of the at least one metadata record of the first metadata.

* * * * *